Nov. 16, 1954  H. M. JOHANSEN  2,694,501
CONTAINER CLOSING MEANS
Filed May 9, 1951

INVENTOR.

Harry Mathias Johansen.

2,694,501

CONTAINER CLOSING MEANS

Henry Mathias Johansen, Nyborg, Denmark

Application May 9, 1951, Serial No. 225,329

Claims priority, application Denmark May 10, 1950

3 Claims. (Cl. 220—24.5)

The invention relates to closing means for paint pails or jars, cans, drums, barrels and other containers.

An object of the invention is to provide a container closing means which is simple in design, and by means of which it is possible to keep the closure as well as the adjacent part of the container clean.

Another object is to provide a container closing means which may be readily inserted and removed from the container aperture as occasion requires and which is not only retained against chance displacement but even maintained in fluid tight relation to the container.

A further object is to provide a container closing means comprising a cover with an upwardly turned wall so shaped that it may abut the wall of the container aperture, a pressure ring disposed within the said cover, which pressure ring is shaped as the surface of a truncated cone and has its exterior periphery abutting the inside of said cover wall, and means for retaining the pressure ring in a depressed position, by which the expansion of the pressure ring due to the depression press the cover wall against the container wall.

A still further object is to provide a container closing means comprising a bowlshaped cover with an upwardly turned side wall so shaped that it may abut the wall of the container aperture, a pressure ring disposed within the cover and shaped as the surface of a truncated cone, which pressure ring has its exterior periphery abutting the inside of said cover wall, and which means further comprises means for arresting a depression of the pressure ring so far below the upright truncated cone formed by the pressure ring prior to the depression that after the depression there is formed an inverted truncated cone with a smaller height than the upright truncated cone. Thus, when depressed the pressure ring will be retained in an expanded position by which the cover constitutes a tight and firm sitting closure for the container.

The container closing means according to the invention may be employed in jars, cans and the like containers of conventional types, such as for instance containers made of sheet tin in which the edge of the container aperture is reinforced by means of a ring or bead. The closing means may likewise be employed in containers with thick side walls such as jars made of glass or earthenware or similar containers with or without a neck and with or without a reinforcement of the aperture edge.

In describing the invention in detail, reference is herein had to the accompanying drawing, in which—

Figure 1:
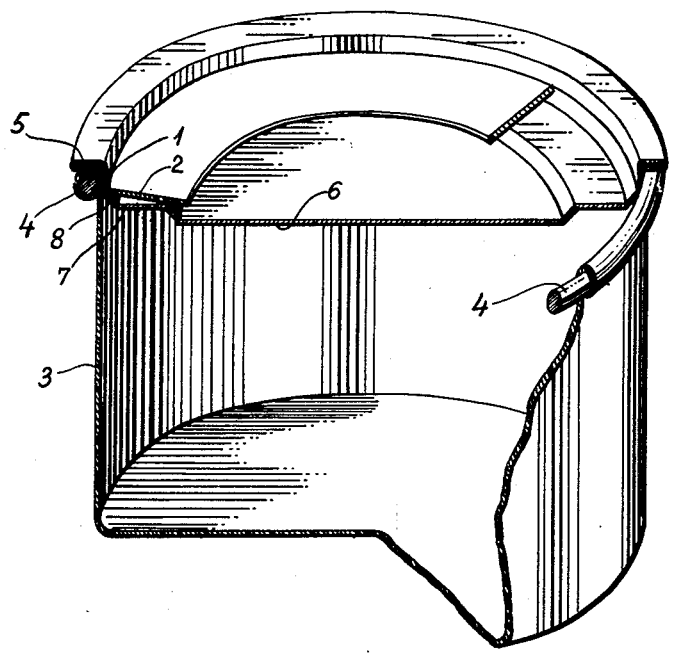
Figure 2:
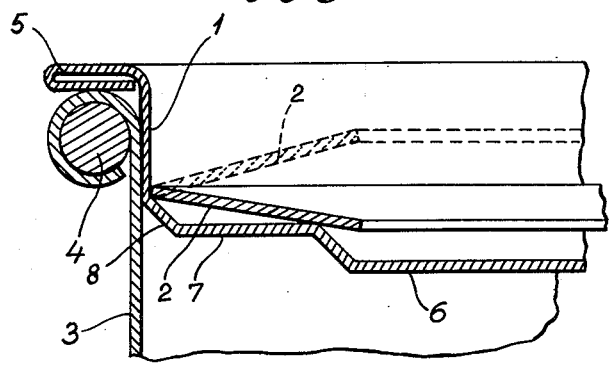

Fig. 1 shows in perspective view and partly in section a cylindrical container provided with a closure according to the invention, and Fig. 2 shows on a larger scale a section through a part of the upper end of the container with inserted closure.

Referring to the drawing, 3 indicates the container, which is made of e. g. tin sheet. The top edge of the container 3 is beaded around a reinforcement ring 4 to provide a support for a bowlshaped cover likewise made of tin sheet. This cover has an upwardly bent cylindrical wall 1 which fits into the container aperture. The part of the cover connecting the wall 1 to the centre part 6 of the cover comprises a conical annularly shaped portion 8 and a flat annularly shaped portion 7 disposed at a somewhat higher level than the said centre part 6 and parallel thereto. The upper edge of the cylindrical wall 1 is bent outwardly to form a flange 5 which is folded back to provide reinforcement.

The cover is attached to the container by means of a pressure ring 2 shaped to correspond to the inclined surface of a truncated cone, see Fig. 2. The outer periphery of the pressure ring abuts the lower end of the interior surface of wall 1 and is supported by the conical wall part 8. In its locking position, shown with full lines in Fig. 2, the pressure ring 2 has its interior circumference extending somewhat in over the centre cover part 6, in which position the pressure ring 2 forms an inverted truncated cone of little height. In the said position the outer periphery of the closure ring 2 presses the wall 1 tightly against the container wall 3, and owing to the tension between this wall and the pressure ring 2 the cover is held firmly in position.

To remove the cover, the pressure ring 2 by means of a suitable tool, e. g. a short rod having an angularly bent end, which is inserted beneath the inner edge of the ring, is forced up to the position shown in broken lines in Fig. 2, in which position the pressure ring now has the shape of the surface of an upwardly turned truncated cone which is somewhat higher than the above described inverted truncated cone. Consequently the tension between the pressure ring and the wall 1 is released so that the pressure ring may easily be detached, and the cover removed from the container.

To apply the cover to the container, the cover is placed in position within the container top, while the pressure ring takes up the position shown in dash lines in Fig. 2. The ring is now depressed to the position shown in full lines in Fig. 2, and the expansion of the thus depressed ring will press the wall 1 tightly against the container wall as described above.

It will be seen from the foregoing that novel and advantageous provision has been made for carrying out the objects of the invention. Preferred details have been shown but within the scope of the invention as claimed, numerous variations may be made.

I claim:

1. In a closure, for use in connection with a container having at one end a recessed annularly walled cover, in combination, an endless tapered pressure member disposed in said cover and having outer and inner substantially parallel tapered surfaces and having an outermost contour matching the inner contour of said cover wall, said member normally being in an inactive position wherein its outermost contour is slidable on said wall towards and from said bottom, and being operable, by the application of downwardly directed force against the interior of the member while supporting the outermost contour, to be pushed beyond dead center to assume an inverted shape in an active position, the outermost contour during inversion first expanding to a maximum at dead center and again contracting beyond dead center, means connected to said cover and operable to limit inversion of said member to the active position wherein said outermost contour thereof is larger than in inactive position and sufficiently large to engage said wall pressing it radially outwardly, and an abutment connected to said cover and operable to support said outermost contour of said member during the application of inversion force, said abutment being spaced above said limiting means for a distance sufficient to admit therebetween the inverted member in active position, said member in active position being sufficiently beyond dead center to restrain accidental reversion.

2. In a closure, for use in connection with a container including at one end on the interior a closely fitting recessed cover having a wall including a side wall and a bottom, and being open on top, in combination, an endless hollow pressure member tapered internally and externally and insertable through said open top into said cover and normally having a downwardly outwardly flaring shape of predetermined height, and having an outermost contour matching the interior contour of said side wall, said member being operable by downwardly directed force applied to the inside of the member to be pushed beyond dead center to be inverted sufficiently to preclude accidental reversion and to assume an upwardly outward flaring shape, and a support formed on the wall of said cover and operable to support said outermost contour for inversion and to limit the shape at inversion of said member to a height smaller than said normal predetermined height, whereby upon inversion said outer contour of said member will be larger than at normal shape and sufficiently large to engage said side wall pressing it radially outwardly to seal said container tightly, said member in said inverted position being spaced from all other parts of said wall for accessibility to facilitate manual reversion for subsequent re-use.

3. In a closure, as claimed in claim 2, said support including a portion formed on the bottom of said cover inclined downwardly at an angle steeper than that of said inverted member, permitting inversion about said outer contour of said member, and a stop on said bottom for abutment with a portion of said member spaced from said outer contour and operable to limit said inversion.

References Cited in the file of this patent

UNITED STATES PATENTS

| Number | Name | Date |
|---|---|---|
| 801,683 | Penfold | Oct. 10, 1905 |
| 905,652 | Comings | Dec. 1, 1908 |
| 2,077,984 | Bukolt | Apr. 20, 1937 |